United States Patent
Oota (10) Patent No.: US 10,962,111 B2
(45) Date of Patent: Mar. 30, 2021

(54) CONTROL DEVICE AND CONTROL METHOD FOR VEHICLE INCLUDING CONTINUOUSLY VARIABLE TRANSMISSION

(71) Applicants: JATCO Ltd, Fuji (JP); NISSAN MOTOR CO., LTD., Yokohama (JP)

(72) Inventor: Yusuke Oota, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 212 days.

(21) Appl. No.: 16/303,905

(22) PCT Filed: Apr. 12, 2017

(86) PCT No.: PCT/JP2017/014942
§ 371 (c)(1),
(2) Date: Nov. 21, 2018

(87) PCT Pub. No.: WO2017/203874
PCT Pub. Date: Nov. 30, 2017

(65) Prior Publication Data
US 2020/0318736 A1    Oct. 8, 2020

(30) Foreign Application Priority Data
May 25, 2016 (JP) .............................. JP2016-104277

(51) Int. Cl.
*F16H 61/66* (2006.01)
*B60W 10/101* (2012.01)
(Continued)

(52) U.S. Cl.
CPC ............. *F16H 61/66* (2013.01); *B60W 10/06* (2013.01); *B60W 10/101* (2013.01); *B60W 10/18* (2013.01); *B60W 30/18109* (2013.01); *F02N 11/0818* (2013.01); *F16H 61/0031* (2013.01); *F16H 61/662* (2013.01); *B60W 2540/12* (2013.01); *F16H 2061/6605* (2013.01)

(58) Field of Classification Search
CPC .... F16H 61/66; F16H 61/0031; F16H 61/662; F16H 2061/6604; B60W 10/06; B60W 10/101; B60W 10/18; B60W 30/181; B60W 30/18109; B60W 2540/12; B60W 2030/1809; F02N 11/0818
See application file for complete search history.

(56) References Cited

U.S. PATENT DOCUMENTS

2003/0168266 A1* 9/2003 Sasaki .................. B60W 10/08
                                                  180/65.25
2006/0060399 A1* 3/2006 Tabata .................. B60K 6/442
                                                  180/65.23
(Continued)

FOREIGN PATENT DOCUMENTS

JP    S59-073651 A    4/1984
JP    2006-137392 A    6/2006
(Continued)

*Primary Examiner* — Tisha D Lewis
(74) *Attorney, Agent, or Firm* — Foley & Lardner LLP (57) ABSTRACT

A controller changes a shift line of the continuously variable transmission to a high rotation side when execution of automatic brake is detected during sailing stop which stops the engine while driving the vehicle.

12 Claims, 6 Drawing Sheets

(51) Int. Cl.
   *B60W 10/18*    (2012.01)
   *B60W 10/06*    (2006.01)
   *B60W 30/18*    (2012.01)
   *F02N 11/08*    (2006.01)
   *F16H 61/00*    (2006.01)
   *F16H 61/662*   (2006.01)

(56) References Cited

U.S. PATENT DOCUMENTS

2006/0137920 A1* 6/2006 Aoki .................. F16H 57/0434
                                                    180/65.225
2009/0192683 A1   7/2009 Kondou et al.
2019/0039586 A1* 2/2019 Suzuki ................ B60W 10/188

FOREIGN PATENT DOCUMENTS

| JP | 4193600 B2 | 12/2008 |
| JP | 2009-138923 A | 6/2009 |
| JP | 2009-216167 A | 9/2009 |
| JP | 2013-213557 A | 10/2013 |
| JP | 2016-016753 A | 2/2016 |
| WO | WO-2016/021431 | 2/2016 |

\* cited by examiner

CONTROL DEVICE AND CONTROL METHOD FOR VEHICLE INCLUDING CONTINUOUSLY VARIABLE TRANSMISSION

TECHNICAL FIELD

The present invention relates to control when automatic brake is executed during sailing stop in a vehicle equipped with a continuously variable transmission.

BACKGROUND ART

JP2013-213557A discloses sailing stop control that sets an automatic transmission to be a neutral state (a power interruption state) and stops a driving source when a sailing stop start condition is satisfied. For example, it is determined that the sailing stop start condition is satisfied when a forward range is selected, a vehicle speed is equal to or higher than the set vehicle speed (medium to high vehicle speed), and an accelerator pedal and a brake pedal are not depressed.

Further, JP4193600B discloses control that executes automatic brake when there is a possibility of collision with an object in front.

SUMMARY OF INVENTION

During the automatic brake, for the safety reason, energy is distributed preferentially to a brake system and a power steering system and the maximum instantaneous energy that can be used by the transmission is limited.

On the other hand, when the transmission is a continuously variable transmission, if rapid deceleration occurs due to the brake during sailing stop, a speed ratio is suddenly changed based on a shift line, Specifically, the transmission is downshifted at a high shift speed and accordingly, the energy required for the transmission instantaneously increases.

Therefore, when the automatic brake is executed during the sailing stop, the maximum available instantaneous energy is limited so that the transmission cannot be shifted at a high shift speed and the downshift cannot be sufficiently performed. When the downshift is not sufficiently performed, the driving force becomes insufficient at the time of restarting or reaccelerating after releasing the automatic brake, which gives a driver an uncomfortable feeling.

The present invention has been made in an effort to allow the downshift to be sufficiently performed even when the automatic brake is executed during the sailing stop and allow the driving force required at the time of restarting or reaccelerating after releasing the automatic brake to be obtained.

According to an aspect of the present invention, a control device of a vehicle including a driving source and a continuously variable transmission is provided. The control device includes a control unit configured to change a shift line of the continuously variable transmission to a high rotation side when execution of automatic brake is detected during sailing stop which stops the driving source while driving the vehicle.

Further, according to another aspect of the present invention, a corresponding control method of a vehicle is provided.

According to the above-described aspects, when the execution of the automatic brake is detected, the shift line is changed to the high rotation side. By doing this, prior to rapid deceleration of the vehicle, downshift of the transmission is partially performed in advance.

Thereafter, in accordance with the rapid deceleration of the vehicle, the downshift of the transmission is performed at a high shift speed. However, the downshift amount during the rapid deceleration is reduced by increasing a downshift amount before the rapid deceleration and the shift speed of the transmission during the rapid deceleration is suppressed so that the maximum instantaneous energy required for the transmission is suppressed.

Therefore, even though the maximum instantaneous energy which can be supplied to the transmission is limited by executing the automatic brake, it is possible to downshift the transmission while suppressing the instantaneous energy required for the transmission to be equal to or lower than the maximum energy. Further, the transmission is sufficiently downshifted during the automatic brake and a driving force required at the time of restarting and reaccelerating after releasing the automatic brake can be obtained.

DESCRIPTION OF EMBODIMENTS

Hereinafter, an exemplary embodiment of the present invention will be described with reference to the accompanying drawings.

Figure 1:
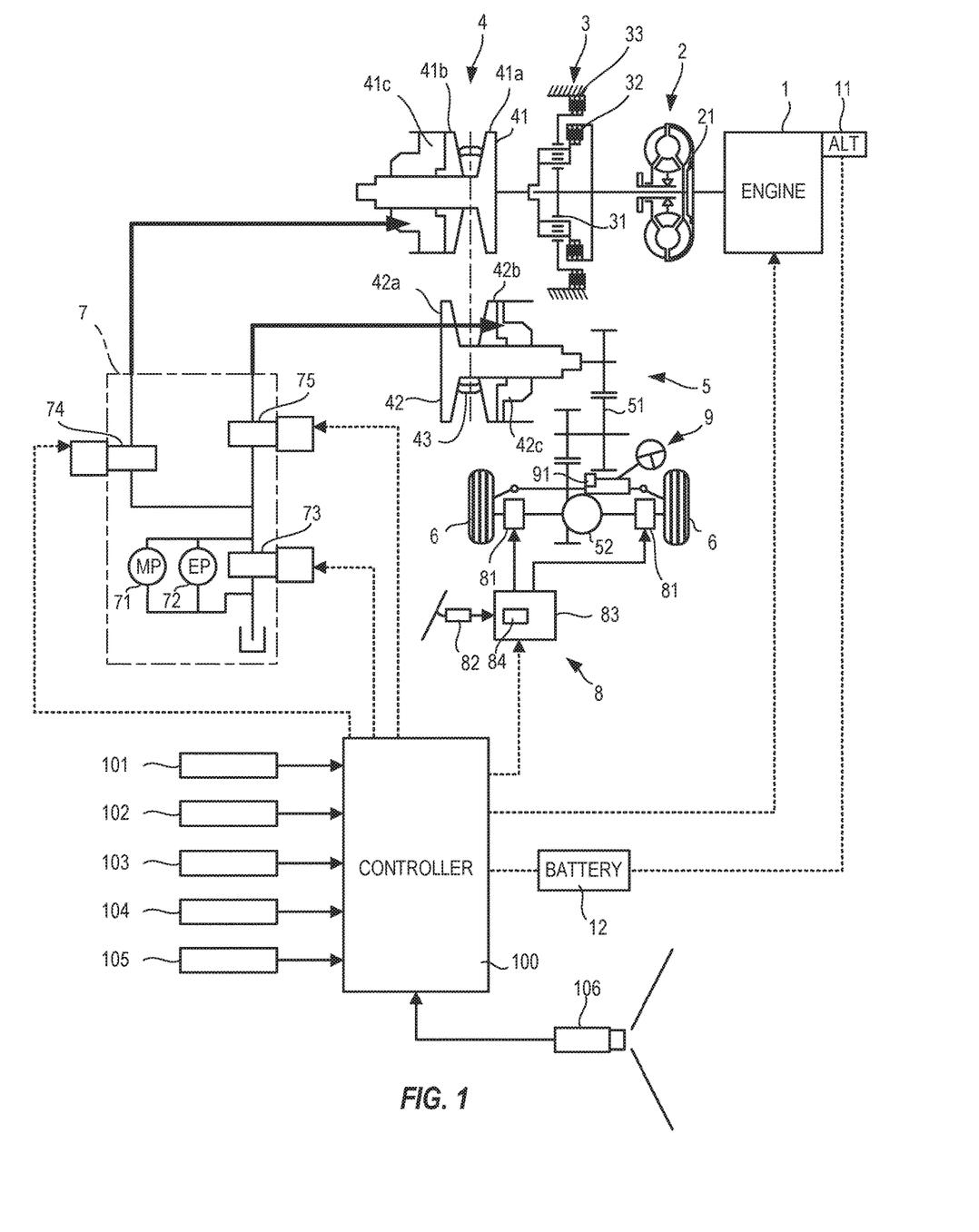
FIG. 1 is a schematic diagram of a vehicle to which a control device according to an exemplary embodiment of the present invention is applied.

FIG. 1 illustrates a schematic configuration of a vehicle to which a control device according to an exemplary embodiment of the present invention is applied. A vehicle includes an engine 1 as a power source. Output rotation of the engine 1 is transmitted to driving wheels 6 via a torque converter 2, a forward/reverse switching mechanism 3, a transmission 4, and a final reduction mechanism 5.

The engine 1 is an internal combustion engine which uses gasoline, diesel oil, etc. as a fuel, and a rotation speed and a torque are controlled by a controller 100 which will be described below. Further, during a sailing stop which will be described below, the fuel supply to the engine 1 stops and the transmission 4 is controlled to be a neutral state (a power interruption state) and the rotation of the engine 1 stops.

An alternator 11 which is driven using a part of a driving force of the engine 1 is mounted in the engine 1. An electric power generated by the alternator 11 is distributed to a brake system 8, a power steering system 9, an electric oil pump 72, and a battery 12. When the engine 1 stops and the electricity generation of the alternator 11 stops, the electric power stored in the battery 12 is distributed to the brake system 8, the power steering system 9, and the electric oil pump 72 instead of the electric power generated by the alternator 11.

The torque converter 2 is a torque converter having a lock-up clutch 21. The lock-up clutch 21 is controlled to be engaged or disengaged by the controller 100 which will be described below, based on a vehicle speed. When the lock-up clutch 21 is disengaged, the torque converter 2 amplifies and outputs a torque input from the engine 1. When the lock-up clutch 21 is engaged, an input shaft and an output shaft of the torque converter 2 are directly coupled to each other and a transmission loss caused by slip of the torque converter 2 is suppressed.

The forward/reverse switching mechanism 3 is configured by a double pinion planetary gear mechanism 31, a forward clutch 32, and a backward brake 33. The forward/reverse switching mechanism 3 implements a forward state in which rotation is transmitted while maintaining a rotation direction when the forward clutch 32 is engaged and the backward brake 33 is disengaged and implements a reverse state in which the rotation direction is reversed to transmit the rotation when the forward clutch 32 is disengaged and the backward brake 33 is engaged. Further, when both the forward clutch 32 and the backward brake 33 are disengaged, a neutral state of the transmission 4 is implemented and a power interruption state in which the engine 1 is separated from the power train is implemented.

The transmission 4 is a continuously variable transmission configured by a primary pulley 41, a secondary pulley 42, and a belt 43 stretched between the primary pulley 41 and the secondary pulley 42. When groove widths of the primary pulley 41 and the secondary pulley 42 are changed respectively, contact radii of the primary pulley 41 and the secondary pulley 42 with the belt 43 are changed so that a speed ratio of the transmission 4 continuously varies. The speed ratio of the transmission 4 is controlled by the controller 100 which will be described below.

The primary pulley 41 is configured by a fixed pulley 41a and a movable pulley 41b which is disposed to be opposite to the fixed pulley 41a and has an oil chamber 41c on a rear surface. Similarly, the secondary pulley 42 is configured by a fixed pulley 42a and a movable pulley 42b which is disposed to be opposite to the fixed pulley 42a and has an oil chamber 42c on a rear surface.

The groove widths of the primary pulley 41 and the secondary pulley 42 are changed by changing hydraulic pressures supplied to the oil chambers 41c and 42c and displacing the movable pulleys 41b and 42b. The hydraulic pressures supplied to the oil chambers 41c and 42c are supplied from a hydraulic circuit 7.

The hydraulic circuit 7 adjusts a hydraulic pressure generated by at least one of a mechanical oil pump 71 and the electric oil pump 72 to a line pressure by a regulator valve 73. Further, the line pressure is adjusted to a primary pressure and a secondary pressure by a first pressure regulating valve 74 and a second pressure regulating valve 45. The primary pressure and the secondary pressure are supplied to the oil chamber 41c of the primary pulley 41 and the oil chamber 42c of the secondary pulley 42 to shift the transmission 4 or maintain the speed ratio.

The mechanical oil pump 71 is driven using a part of a driving force of the engine 1. When the engine 1 stops, the mechanical oil pump 71 also stops. Therefore, while the engine 1 stops, the hydraulic pressure required for the transmission 4 or the forward/reverse switching mechanism 3 is generated by the electric oil pump 72 which is driven by the electric power supplied from the battery 12. Since the rotation speed of the electric oil pump 72 needs to be increased as the required hydraulic pressure is higher, the electric power required for the electric oil pump 72 is increased as the required hydraulic pressure becomes higher.

Figure 2:
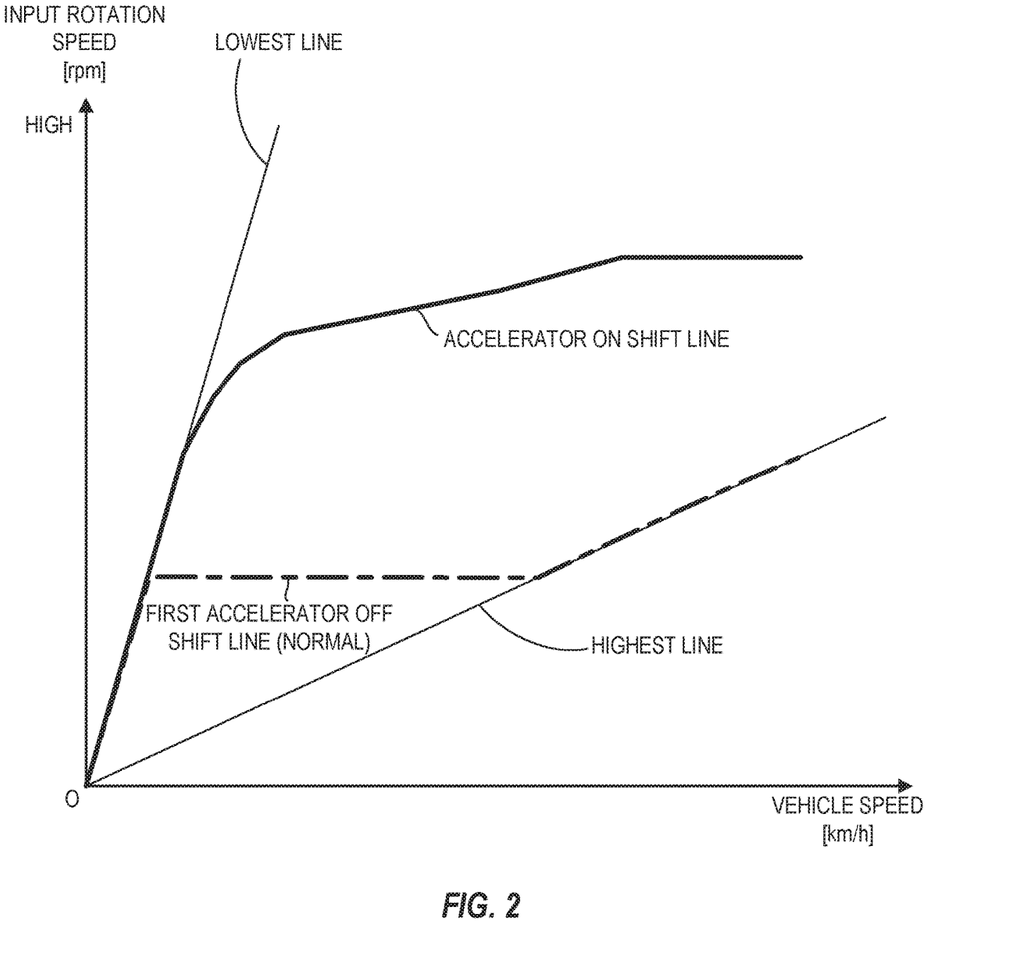
FIG. 2 is an example of a shift map.

Further, the speed ratio of the transmission 4 is controlled to set a target input rotation speed of the transmission 4 based on a vehicle speed and a depression amount of the accelerator pedal with reference to a shift map illustrated in FIG. 2 and reach the target input rotation speed. Further, in FIG. 2, for easy understanding, only a shift line (an accelerator ON shift line) when the accelerator pedal is depressed to the maximum and a shift line (an accelerator OFF shift line) when the accelerator pedal is not depressed are illustrated. On an actual shift map, a plurality of shift lines when the accelerator pedal is partially depressed is set between the accelerator ON shift line and the accelerator OFF shift line.

Since a value obtained by dividing an input rotation speed of the transmission 4 by an output rotation speed (a vehicle speed) is a speed ratio of the transmission 4, setting of the target input rotation speed of the transmission 4 is equivalent to setting of a target speed ratio of the transmission 4.

The final reduction mechanism 5 is configured by a plurality of gear trains 51 and a differential gear mechanism 52 and transmits output rotation of the transmission 4 to the driving wheels 6.

Further, in the vehicle, a brake system 8 for braking the driving wheels 6 and driven wheels which are not illustrated is provided.

The brake system 8 is configured by a hydraulic brake 81 applied to each wheel, a brake sensor 82 which detects the depression of the brake pedal performed by a driver, and a hydraulic pressure adjusting unit 83 which adjusts a brake hydraulic pressure of the hydraulic brake 81.

When the depression of the brake pedal performed by the driver is detected, a brake actuator 84 in the hydraulic pressure adjusting unit 83 operates by the electric power from the alternator 11 or the battery 12. The brake actuator 84 adjusts the brake hydraulic pressure to a hydraulic pressure corresponding to the depression amount of the brake pedal by displacing a piston of a master cylinder. In addition, the brake system 8 may operate also when automatic brake is executed as it will be described below.

The power steering system 9 assists the steering of the driver by a motor which is driven by an electric power supplied from the alternator 11 or the battery 12.

The controller 100 is configured by a plurality of control units (an engine control unit, a transmission control unit, or a body control module) which is connected to communicate with each other via a CAN. Each control unit is configured by a microprocessor, a memory, and an input/output interface.

The controller 100 determines a driving status of the vehicle based on inputs from the various sensors which detect the driving status of the vehicle and collectively controls the engine 1, the lock-up clutch 21, the forward/reverse switching mechanism 3, the transmission 4, the brake system 8, the power steering system 9, and the electric oil pump 72. The various sensors include a vehicle speed sensor 101, an accelerator pedal opening sensor 102, a brake sensor 82, an engine rotation speed sensor 103, a transmission input rotation speed sensor 104, and a range selection switch 105.

Further, a camera 106 which photographs the front of the vehicle in a traveling direction is connected to the controller 100. The controller 100 detects an object (vehicles, people, and obstacles) in the front of the vehicle by analyzing images photographed by the camera 106. Therefore, when it is determined that there is a possibility of collision with the object in the front of the vehicle, the controller 100 issues a warning including a sound or a message to the driver. Further, even though the driver receives the warning but does not depress the brake pedal, the controller 100 automatically operates the hydraulic brake 81 (automatic brake). The detecting method of the object in the front of the vehicle is not limited to the method using the camera 106 and instead of the camera 106 or in addition to the camera 106, a detecting method using an infrared device or a millimeter wave radar may also be used.

Further, in a coasting state in which the vehicle coasts in an accelerator OFF state, the controller 100 performs sailing stop control which completely stops the rotation of the engine 1 by stopping the engine 1 and making the transmission 4 a neutral state. During the sailing stop, the engine 1 is not co-rotated and the engine brake does not act on the driving wheels 6, so that the fuel efficiency of the vehicle may be improved.

Specifically, when a forward range is selected, a vehicle speed is equal to or higher than a set vehicle speed (medium or high vehicle speed), and the accelerator pedal and the brake pedal are not depressed, the controller 100 determines that the sailing stop start condition is satisfied and stops supplying the fuel to the engine 1 and disengage the forward clutch 32 and the backward brake 33 of the forward/reverse switching mechanism 3 to make the transmission 4 the neutral state.

By the way, during the sailing stop, as the engine 1 stops and the electricity generation of the alternator 11 stops, the electric power is distributed from the battery 12, instead of the alternator 11, to the brake system 8, the power steering system 9, and the electric oil pump 72.

When it is assumed that a maximum output of the battery 12 is X and n1 and n2 are arbitrary positive numbers, the electric power is distributed by distributing X/n1 to the brake system 8 at the maximum, distributing X/n2 to the power steering system 9 at the maximum, and distributing X−(X/n1+X/n2) to the remaining parts at maximum.

On the other hand, while the automatic brake is executed, for the safety reason, the electric power is distributed preferentially to the brake system 8 and the power steering system 9. By doing so, while the automatic brake is executed, the hydraulic brake 81 certainly operates and the steering operation is enabled. According to the above-described example, while the automatic brake is executed, n1 and n2 are changed to values smaller than that when the automatic brake is not executed.

Therefore, when the automatic brake is executed during the sailing stop, as the electric power distribution to the brake system 8 and the power steering system 9 are preferentially performed, the maximum electric power (a maximum value of an instantaneous energy) which is available in the transmission 4 is limited.

In this situation, even though it is necessary to promptly downshift the transmission 4 in accordance with rapid deceleration of the vehicle, it is difficult to satisfy a power demand from the electric oil pump 72 and a shift speed (a changed amount of a speed ratio for unit time) of the transmission 4 is limited. As a result, the transmission 4 is insufficiently downshifted and there may be a possibility that a driving force which is necessary at the time of restarting and reaccelerating after releasing the automatic brake cannot be obtained.

When the engine 1 restarts, the alternator 11 resumes electricity generation and the mechanical oil pump 71 is driven so that the above-mentioned problems may be solved. However, a starter motor used to restart the engine 1 has a high power consumption, it takes time to restart the engine 1, and the restarting of the engine 1 may be prohibited depending on the driving situation. There may be a possibility that the above-mentioned problems cannot be solved.

In view of these points, it is desirable to implement the shift with an electric power which can be supplied from the battery 12.

Therefore, in the exemplary embodiment, when the automatic brake is executed during the sailing stop, the accelerator OFF shift line is changed to a high rotation side (hereinafter, an accelerator OFF shift line before being changed is referred to as a "first accelerator OFF shift line" and an accelerator OFF shift line after being changed is referred to as a "second accelerator OFF shift line").

Figure 3:
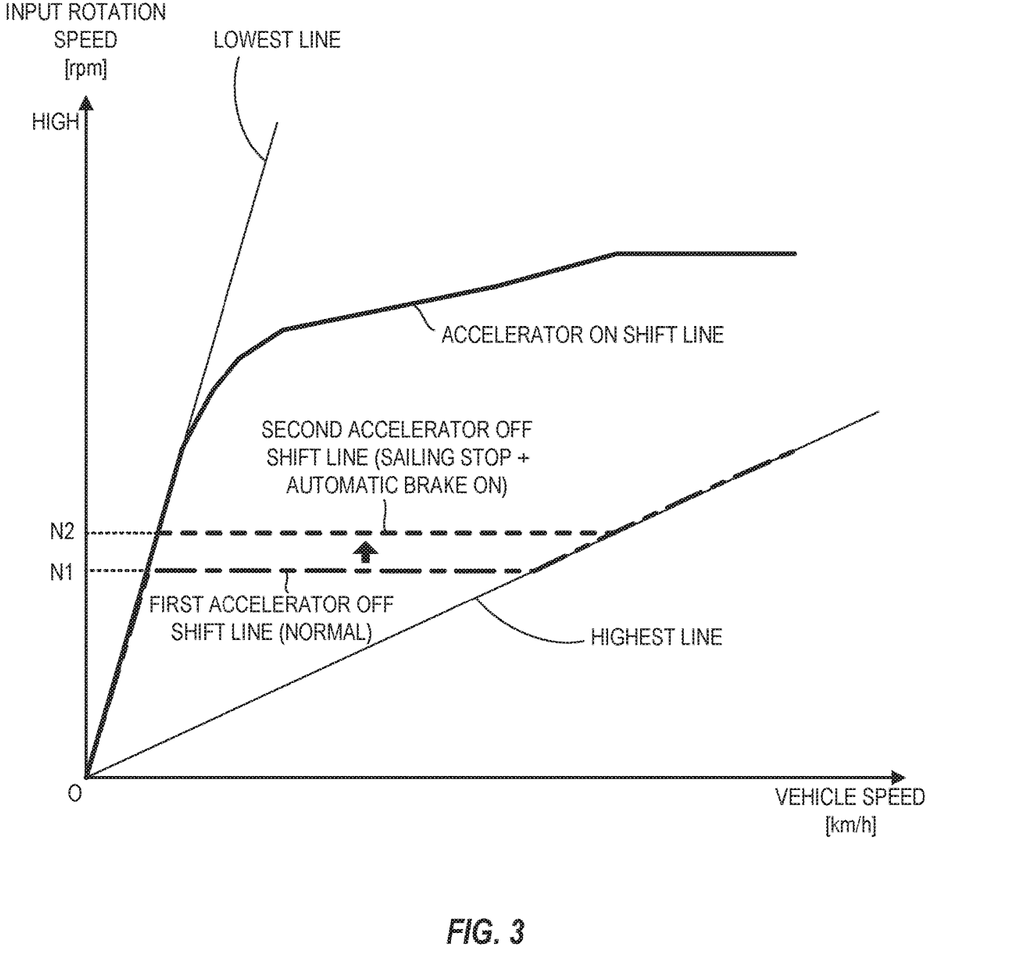
FIG. 3 is a view for explaining an accelerator OFF shift line when an automatic brake is executed during sailing stop.

The changing of the accelerator OFF shift line to the high rotation side is the changing of the target input rotation speed with respect to each vehicle speed to a higher value in a vehicle speed range where the shift line is used. On the shift map, as illustrated in FIG. 3, the shift line is shifted to the upper side (the high rotation side).

When the accelerator OFF shift line is changed from the first accelerator OFF shift line to the second accelerator OFF shift line, the target input rotation speed of the transmission 4 is changed from N1 to N2 stepwise so that a target speed ratio of the transmission 4 is changed to be low stepwise and a downshift amount at the beginning of the shift is increased. By doing this, the downshift is partially performed in advance before the rapid deceleration occurs by the automatic brake and then the downshift amount during the rapid deceleration is decreased to lower the shift speed so that a maximum power required for the transmission 4 during the shift is suppressed.

Figure 4:
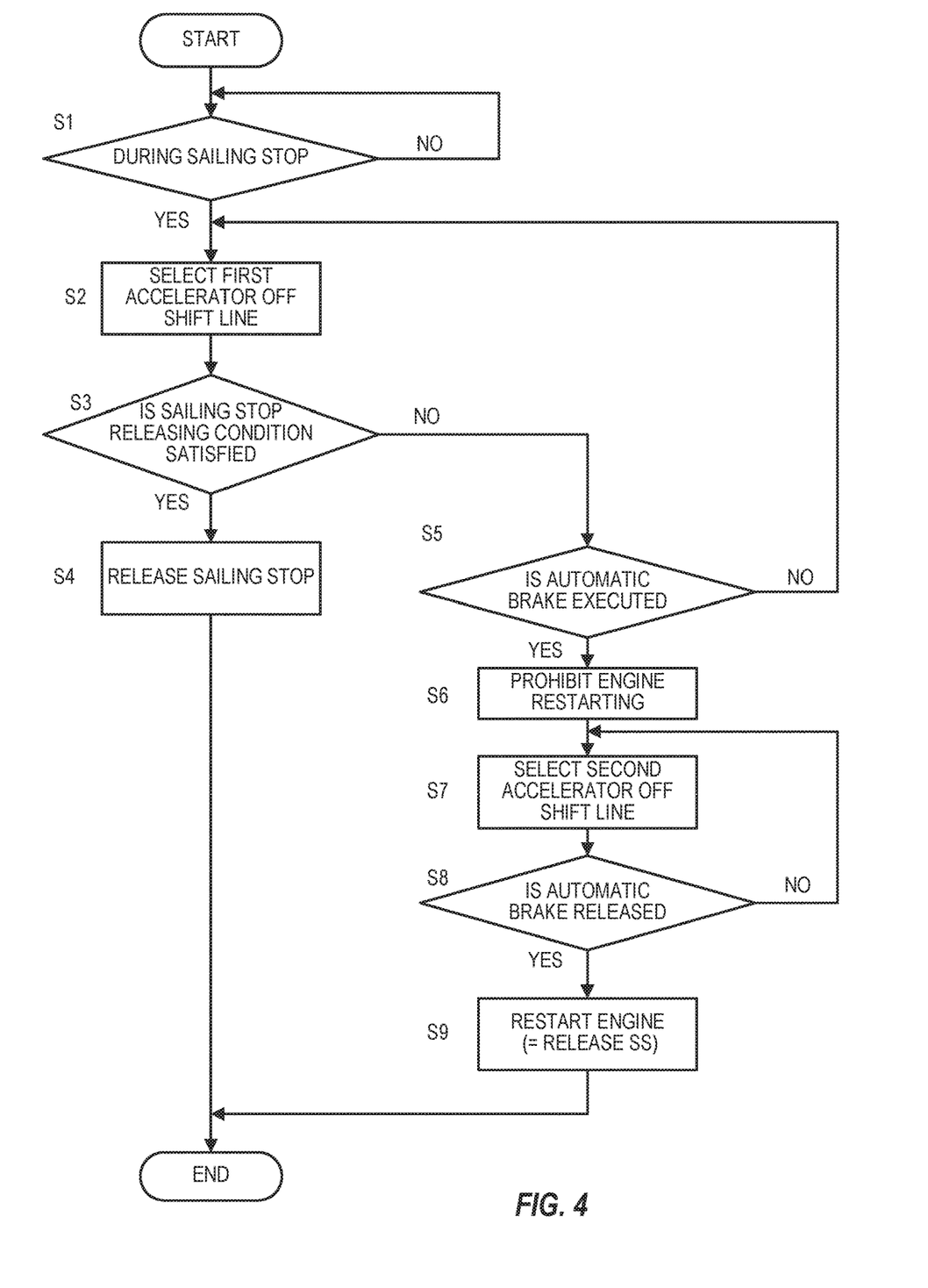
FIG. 4 is a flowchart for explaining control contents of a controller.

FIG. 4 is a flowchart for explaining control contents of the controller 100 for implementing as described above.

The control contents will be described. In step S1, the controller 100 determines whether the sailing stop is executed. It is possible to determine whether the sailing stop is executed by setting a specific value (for example, 1) to a predetermined flag at the time of starting the sailing stop and setting another specific value (for example, 0) to the flag at the time of releasing the sailing stop and then referring the value of the flag. During the sailing stop, the process proceeds to step S2.

In step S2, the controller 100 selects a first accelerator OFF shift line (see FIG. 3) as a shift line when the accelerator is OFF. By doing this, the transmission 4 is shifted such that an operating point of the transmission 4 determined by the vehicle speed and an input rotation speed moves along the first accelerator OFF shift line.

In step S3, the controller 100 determines whether the sailing stop releasing condition is satisfied. The sailing stop releasing condition is satisfied if an accelerator pedal or a brake pedal is depressed during the sailing stop.

When the sailing stop releasing condition is satisfied, the process proceeds to step S4 and the controller 100 releases the sailing stop. That is, the controller 100 starts the engine 1 and engages the forward clutch 32.

In the meantime, in step S3, when the sailing stop condition is not satisfied, the process proceeds to step S5.

In step S5, the controller 100 determines whether it has been detected that the automatic brake is executed. It is possible to determine whether the automatic brake is executed by setting a specific value (for example, 1) to a predetermined flag at the time of executing the automatic brake and setting another specific value (for example, 0) to the flag at the time of releasing the automatic brake and then referring the value of the flag.

When the execution of the automatic brake is detected, the process proceeds to step S6 and otherwise the process returns to step S2.

In step S6, the controller 100 prohibits the restarting of the engine 1.

In step S7, the controller 100 selects the second accelerator OFF shift line (see FIG. 3) which is set at the higher rotation side than the first accelerator OFF shift line as a shift line when the accelerator is OFF. By doing this, the target input rotation speed of the transmission 4 is changed from N1 to N2 and the operating point of the transmission 4 on or in the vicinity of the first accelerator OFF shift line moves toward the second accelerator OFF shift line from a position X at the timing when the execution of the automatic brake is detected as illustrated by the solid line in FIG. 5 and the transmission 4 is downshifted prior to the rapid deceleration of the vehicle by the automatic brake.

Figure 5:
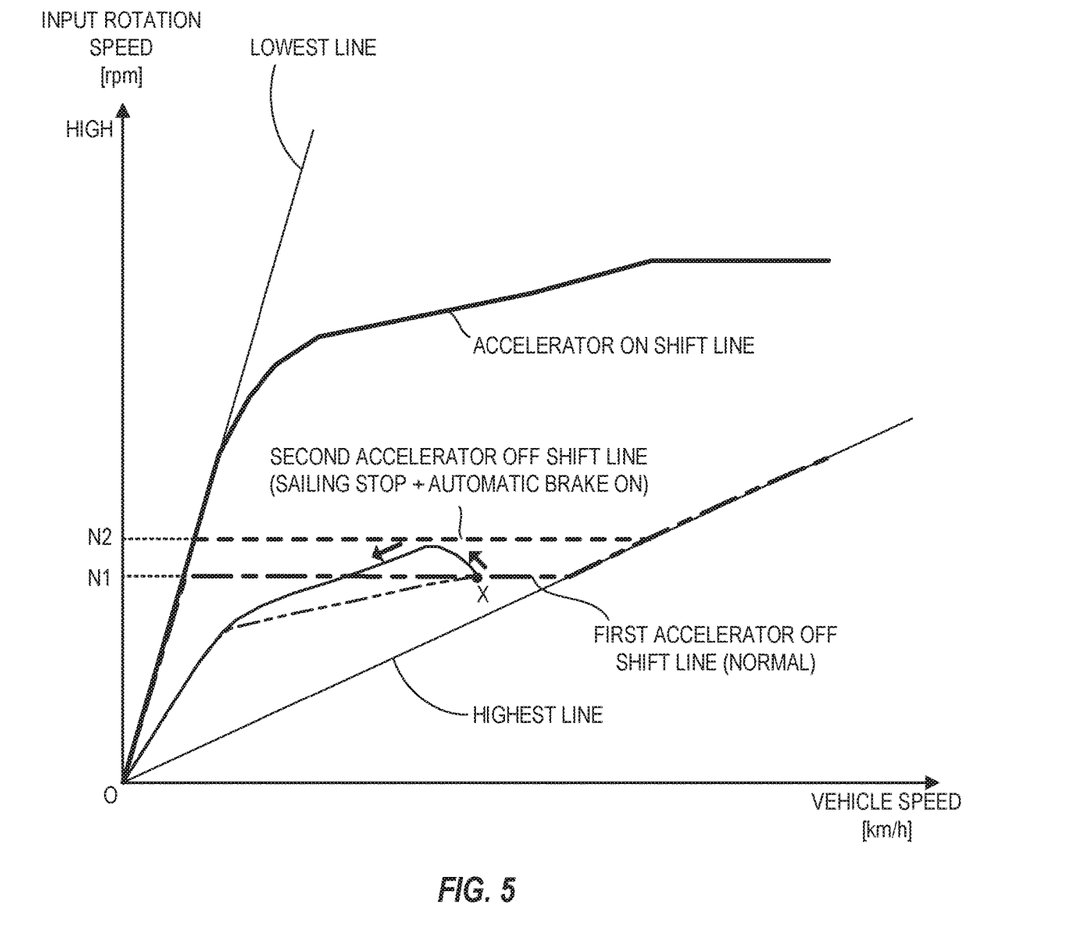
FIG. 5 is a view illustrating a behavior of a transmission on a shift map when an accelerator OFF shift line is changed.

Thereafter, the transmission 4 is downshifted at a high shift speed in accordance with the rapid deceleration of the vehicle and the operating point of the transmission 4 moves toward the origin point O. Further, the two-dot chain line in the drawing is a behavior of the operating point of the transmission 4 when the shift line is not changed.

The process of step S7 is continued until it is determined that the automatic brake is released in step S8.

When it is determined that the automatic brake is released in step S8, the process proceeds to step S9 and the controller 100 restarts the engine 1 and engages the forward clutch 32 (sailing step releasing).

Figure 6:
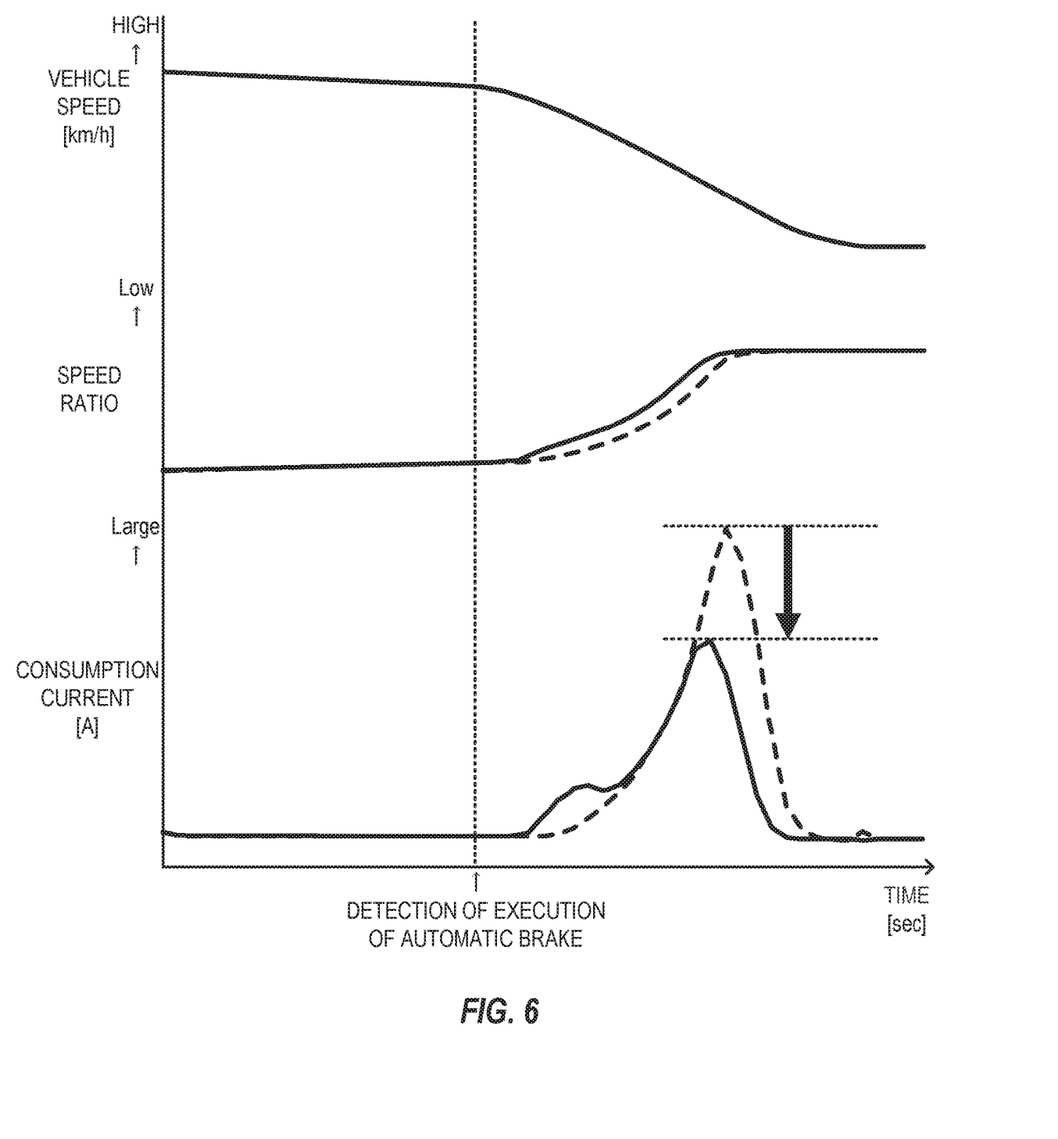
FIG. 6 is a timing chart illustrating a state when an automatic brake is executed during sailing stop.

FIG. 6 illustrates a state when an automatic brake is executed during the sailing stop. The solid line represents the exemplary embodiment (the shift line is changed) and the broken line represents a comparative example (the shift line is not changed). The operation and effect obtained by performing the above-described control will be described with reference to FIG. 6.

A state before executing the automatic brake is a state when the sailing stop is being performed and in this state, the vehicle speed is gradually lowered and in response to this, the transmission 4 is slowly downshifted. The shift line used at this time is the first accelerator OFF shift line (see FIG. 2).

When the execution of the automatic brake starts and the execution is detected, the shift line is changed from the first accelerator OFF shift line to the second accelerator OFF shift line. The target input rotation speed is changed to the high rotation side by changing the shift line so that the transmission 4 is partially downshifted in advance prior to the rapid deceleration of the vehicle. Since there is a slight delay time from a time when an operation of the brake actuator 84 starts until a braking force actually acts on the driving wheels 6, the rapid deceleration of the vehicle by the automatic brake is delayed from a timing when the execution of the automatic brake is detected.

Thereafter, in accordance with the rapid deceleration of the vehicle, the downshift of the transmission is performed at a high shift speed. However, the downshift amount during the rapid deceleration is reduced by increasing a downshift amount before the rapid deceleration and the shift speed of the transmission 4 during the rapid deceleration is suppressed so that the maximum electric power (the maximum instantaneous energy) required for the transmission 4 is suppressed.

Therefore, even though the maximum electric power which can be supplied to the transmission is limited by executing the automatic brake, it is possible to sufficiently downshift the transmission 4 while suppressing the power consumption of the transmission 4 below the maximum electric power and to allow the driving force required at the time of restarting or reaccelerating after releasing the automatic brake to be obtained.

Further, when the automatic brake is executed during the sailing stop, the engine 1 does not restart but the engine 1 restarts after the automatic brake is released. Therefore, a problem in that the electric power for restarting the engine 1 is consumed to cause insufficient downshift due to the power shortage can be prevented.

Although the embodiment of the present invention has been described above, the above-mentioned embodiment merely shows a part of the application example of the present invention, but the technical scope of the present invention is not limited to the specific configuration of the above embodiment.

For example, in the exemplary embodiment, the driving source is the engine, but the driving source may be a combination of an engine and a motor or a motor. In this case, when the automatic brake is executed during the sailing stop, the driving source (the engine 1 and/or motor) does not restart but the driving source restarts after the automatic brake is released. Therefore, a problem in that the electric power for restarting the driving source is consumed to cause insufficient downshift due to the power shortage can be prevented.

The present application claims a priority of Japanese Patent Application No. 2016-104277 filed with the Japan Patent Office on May 25, 2016, all the contents of which are hereby incorporated by reference.

The invention claimed is:

1. A control device of a vehicle including a driving source and a continuously variable transmission, the control device comprising:
    a controller configured to, when a brake pedal is not depressed during a sailing stop which stops the driving source while driving the vehicle, upon execution of an automatic brake which automatically operates brakes applied to wheels being detected, change a shift line of the continuously variable transmission to a high rotation side before the braking force of the brake acts on the wheels.

2. The control device of a vehicle according to claim 1, wherein
    the controller is further configured to restart the driving source after releasing the automatic brake.

3. The control device of a vehicle according to claim 1, wherein the vehicle has an electric oil pump and
    the controller is configured to, when the controller detects the execution of the automatic brake during the sailing stop, shift the continuously variable transmission using the electric oil pump.

4. The control device of a vehicle according to claim 3, wherein when the brake pedal is not depressed during the sailing stop, which stops the driving source while driving the vehicle, upon execution of the automatic brake which automatically operates brakes applied to the wheels being detected, the controller is configured to increase a rotation speed of the electric oil pump before the braking force of the brake acts on the wheels.

5. A control method of a vehicle including a driving source and a continuously variable transmission, the control method being implemented by a controller and comprising:
    changing a shift line of the continuously variable transmission such that, when a brake pedal is not depressed during a sailing stop which stops the driving source while driving the vehicle, upon execution of an automatic brake which automatically operates brakes applied to wheels is detected, the shift line of the continuously variable transmission is changed to a high rotation side before the braking force of the brake acts on the wheels.

6. The control method of a vehicle according to claim 5, further comprising:
restarting the driving source after releasing the automatic brake.

7. The control method of a vehicle according to claim 5, wherein the vehicle has an electric oil pump and the control method further comprises:
when the execution of the automatic brake is detected during the sailing stop, shifting the continuously variable transmission using the electric oil pump.

8. The control method of a vehicle according to claim 7, further comprising:
when the brake pedal is not depressed during the sailing stop, which stops the driving source while driving the vehicle, upon execution of the automatic brake which automatically operates brakes applied to the wheels is detected, increasing a rotation speed of the electric oil pump before the braking force of the brake acts on the wheels.

9. A control device of a vehicle including a driving source and a continuously variable transmission, the control device comprising:
control means for, when a brake pedal is not depressed during a sailing stop, which stops the driving source while driving the vehicle, upon execution of an automatic brake which automatically operates brakes applied to wheels is detected, changing a shift line of the continuously variable transmission to a high rotation side before the braking force of the brake acts on the wheels.

10. The control device of a vehicle according to claim 9, wherein
the control means restarts the driving source after releasing the automatic brake.

11. The control device of a vehicle according to claim 9, wherein the vehicle has an electric oil pump, and
when the control means detects the execution of the automatic brake during the sailing stop, the control means shifts the continuously variable transmission using the electric oil pump.

12. The control device of a vehicle according to claim 11, wherein when the brake pedal is not depressed during the sailing stop, which stops the driving source while driving the vehicle, upon execution of the automatic brake which automatically operates brakes applied to the wheels is detected, the control means increases a rotation speed of the electric oil pump before the braking force of the brake acts on the wheels.

* * * * *